Feb. 16, 1971 V. NIKOLIC 3,562,909
APPARATUS FOR THE CONTINUOUS PRODUCTION OF TELEMEA CHEESE
Original Filed Oct. 24, 1966
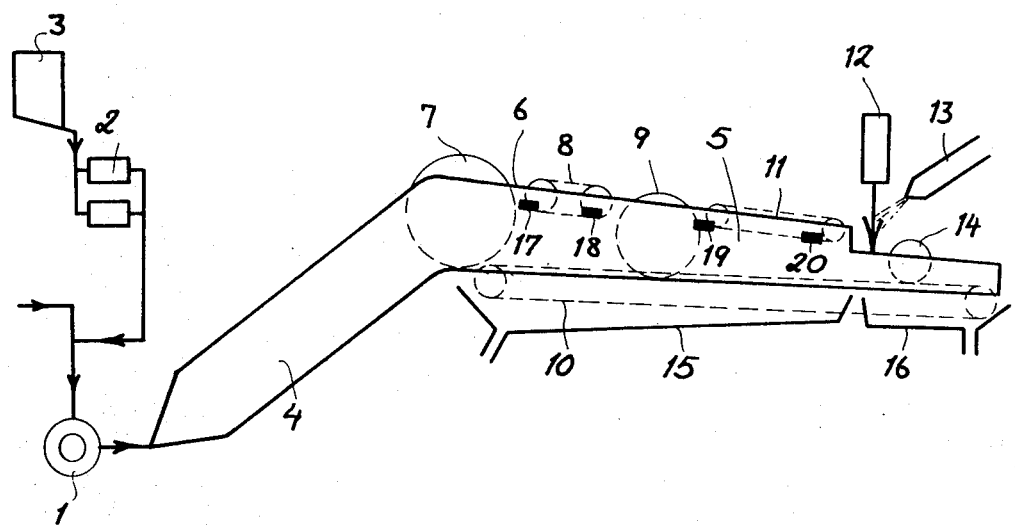
Vasilie Nikolič
INVENTOR.
BY
Karl F. Ross
Attorney

United States Patent Office 3,562,909
Patented Feb. 16, 1971

3,562,909
APPARATUS FOR THE CONTINUOUS PRODUCTION OF TELEMEA CHEESE
Vasilie Nikolic, Bucharest, Rumania, assignor to Ministerul Industriei Alimentare, Bucharest, Rumania, a corporation of Rumania
Original application Oct. 24, 1966, Ser. No. 588,924, now Patent No. 3,518,094. Divided and this application Dec. 31, 1968, Ser. No. 810,882
Claims priority, application Rumania, Nov. 16, 1965, 50,550
Int. Cl. A01j 25/00
U.S. Cl. 31—46
4 Claims

ABSTRACT OF THE DISCLOSURE

An apparatus for the continuous production of telemea cheese in which a coagulating mixture of milk and a coagulating agent is passed continuously upwardly through a coagulating duct to form a curd emerging at the upper end of the duct. The curd is then passed along a treatment path provided with cutting disks and squeezing conveyors which alternately slice through the continuous curd layer and express whey from the cut curd. After a final squeezing between conveyor belts, the cheese is cut into blocks and rinsed.

---

This application is a division of application Ser. No. 588,924 filed Oct. 24, 1966 now U.S. Pat. No. 3,518,094.

The present invention relates to an apparatus for making telemea cheese in a continuous process starting from the phase of introducing rennet into the milk and including the phase of portioning the telemea cheese into blocks.

There are known various methods for making cheese in a continuous process. One such process involves crushing the curd by means of cutting devices, laminar conveying of the curd in the renneting phase in the vertical direction, and molding the cheese blocks. The disadvantage of treating curd in grain in the case of telemea cheese in that a nonhomogeneous product is obtained having isotropic structure while telemea cheese is, in fact, a product having an anisotropic structure. Attempts have been made at partial mechanization and at modifying the technology of certain phases of making telemea cheese. Thus there are known processes for crushing the curd in a cheese vat followed by drawing it out by means of large curd scoops or pails and pouring it on a curd-draining table, pressing it in molds, and coagulating it directly on a curd-draining table lined with polyethylene sheet. In fact, these processes do not satisfactorily mechanize the cheese-making process which remains further on as a manual process, but they do represent an improvement of a discontinuous system. The continuous cheese-making process, in which coagulation takes place during ascending movement, is not suitable for telemea-cheese production because of breaking of the curd. Hence an essential condition is not complied with and namely, that in making telemea cheese, the bedding of the milk must be maintained unchanged from coagulating phase to obtention of the finished product. All of the prior attempts to modify the telemea-cheese-making process by passing through a curd crushing phase produced a cheese having pressing caverns, a low conservation index and an unsatisfactory quality.

According to the present invention, an apparatus for making telemea cheese avoids these disadvantages in that milk coagulation, cutting, pressing and portioning of the curd and telemea cheese are carried out in a continuous manner by laminar and rectilinear displacement of the product. The apparatus consists of a feeding set means or device, by which the coagulation solution is injected into milk, the mixture is homogenized and then introducing it into a coagulation means, or device in the form of an inclined tube; in the coagulation device there occurs the coagulation of milk and formation of the curd. The coagulation means is connected further to the treatment body means or device at which are successively carried out the first cutting, the first pressing, the second cutting, the end pressing, the portioning and cooling of the cheese, the displacement being carried out by an inclined conveying belt, and the pressing by means of other inclined pressing belts being gradually reduced during the displacement with respect to the conveying belt.

The invention is described below with reference to the drawing, the sole figure of which is a schematic elevational view of an apparatus according to the invention.

The apparatus consists of a centrifugal milk pump 1, two metering pumps 2 for metering the coagulation solution, a tank 3 for holding the coagulation solution fed to the pumps 2, and a coagulation body 4 to which the pumps of the feed means are connected. The coagulation body has the form of a tube or duct inclined at 25–35° to the horizontal line, fixedly connected with a treatment body tube or duct 5 which may be horizontal or substantially so. The treatment body 5 compresses two lateral walls 6 between which are disposed: a set of knife revolving disks or blade drum 7, a short pressing belt 8 (inclined at 1.5° to belt 10), a second set of knife-revolving disks 9, a conveyor belt 10, a belt for final pressing 11 (inclined at 7 to 8° to belt 10), a guillotine-cutter 12 with hydraulic drive for transversal cutting, a set of nozzles 13 for cool water spraying, a set of disk-knives 14, a trough 15 for collecting whey and a trough 16 for collecting cooling water. The lateral walls 6 are provided with orifices 17, 18, 19, and 20 for eliminating the whey. The belts and the knives are synchronically driven but it is possible to vary the treatment rhythmicity within ±20% with reference to an average speed. The squeezing belts 6, 10, 11 converge in the direction of curd or cheese-block feed.

The process of cheese making is as follows:

Milk is prepared for coagulation by pasteurization, addition of correction agents (calcium chloride, starting culture, eventually alkalinitrates), the acidity is brought to 20–22° C. by means of dilute lactic or hydrochloric acids and the temperature is established at 28.5–30.5° C. The coagulation solution is simultaneously prepared by dissolving rennet in water. The concentration of the coagulation solution is determined by means of the relation:

$$c = \frac{100k \times D \times Pr}{d}$$

where:

$c$ is the concentration of the coagulation solution, in percent $k$—a correction factor of the passage from coagulation in static state to coagulation in flow state (a nondimensional coefficient).

$D$—the flow rate of the milk pump in l./hr.

$Pr$—the relative strength of rennet expressed in conventional units (kg./l.).

$d$—the flow rate of the coagulation solution pumps, as l./hr.

The correction factor determined experimentally for-telema cheese making is $k = 1.4 - 1.8$.

The notion of relative coagulation strength is necessary in order to express the strength of rennet which is related to a certain quality of the milk to be treated in the technological conditions prescribed for the named process.

The quantity of the coagulation solution is determined by the relation:

$$Q = \frac{1.1 \times L \times d}{D}$$

where:

Q is the quantity of the coagulation solution in liters;
L—the quantity of milk in liters which is to be treated after adding the correction agents; and
D and d—the same meaning as above.

The required quantity of rennet is calculated from the values of c and Q.

When milk and the coagulation solution are prepared, the pumps 1 and 2 are put into operation. Milk enters the lower part of the coagulation body 4 and flows upwardly in the form of a laminar, linear, and uniform stream during 30–35 minutes. When it arrives as a curd in front of the knives 7, it is cut vertically by the blades of the knife-disk and crosswise by the wires spanning the disks; the wires join the borders of the outside disks within 10 cm. The cut curd is taken over by the conveyor belt 10 and carried under the treatment devices. The belt 8 exerts a light gradual pressure and the whey is separated and eliminated in the upper part of curd, by draining it through the orifices 17 and 18. The fused curd is cut again by the set of knives (revolving disks) 9 which are closer together than the blade disks of the former set. The eliminated whey is drained by decantation through the lateral orifice 19. The curd is then pressed by the belt 11 and the whey separated is eliminated through the orifice 20. A strip of curd is obtained whose width depends on the transverse size of the unit and which must be a multiple of the block sizes. The strip of cheese is transversely cut by the guillotine cutter which is hydraulically driven by circulating water. The disk-knives of set 14 cut longitudinally the transversely several pieces of cheese, thereby obtaining blocks of telemea cheese. The whey drained is collected by the trough 15 and the cooling water after aspersing the blocks obtained by cutting is collected in the trough 16.

The last portion of curd is drawn out from the coagulation body by pumping a solution of 10% salt sodium chloride through the milk flow line.

The invention presents the following advantages:

The mechanization of the making process of telemea cheese from coagulation to block formation increases the productivity of labor, as the unit is operated by two operators;

It makes possible automation of the cheese-making process;

It provides a uniformity of the production, compact and anisotropic structure of cheese by maintaining the initial stratification of the curd;

It allows maintenance of rigorous conditions of food hygiene;

It provides a high conservability of telemea cheese and;

It reduces the technological losses.

I claim:
1. An apparatus for the continuous production of cheese comprising:
feed means including a plurality of pumps for forming a coagulating mixture of milk and a coagulating agent therefor;
an upwardly extending coagulating duct inclined to the horizontal and connected to said feed means for passing said coagulating mixture upwardly along said duct for a period sufficient to transform said mixture into a continuous curd;
treatment means forming a housing connected with said duct at an upper end thereof and receiving said curd therefrom, said housing being provided with a conveyor belt leading away from said duct for transporting said curd;
at least one set of blade disks disposed above said conveyor belts for severing the curd carried thereby into curd portions;
at least one pressing belt ahead of said set and movable in the direction of said conveyor belt while being inclined thereto in the direction of movement of the curd for squeezing the curd portions to express whey therefrom;
a guillotine cutter along said conveyor belt, downstream of said pressing belt, for severing the curd into cheese blocks; and
means for rinsing the curd with water.

2. The apparatus defined in claim 1 wherein:
said duct is inclined at an angle of 25° to 35° to the horizontal and is of a length dimensioned with respect to the rate of flow of said mixture therethrough to allow a residence time of 30 to 50 minutes of the mixture in said duct, said duct having a rectangular cross-section;
said housing is provided with openings along the path of the curd for permitting the escape of whey therefrom and includes a first trough for collecting the whey expressed from said curd and a second trough for collecting the water used to rinse the curd; and
said apparatus comprises at least two sets of such blades and at least two of such pressing belts alternating with said sets of blades.

3. The apparatus defined in claim 2 wherein the upstream one of said pressing belts is inclined at an angle of about 1.5° with respect to said conveyor belt and the downstream pressing belt is inclined at an angle of 7° to 8° with respect to said conveyor belt.

4. The apparatus as defined in claim 2 wherein said guillotine cutter is hydraulically driven and controlled by an electro-magnetically operable valve synchronized with said conveyor belt.

References Cited

UNITED STATES PATENTS

| | | | |
|---|---|---|---|
| 2,352,210 | 6/1944 | Kraft | 99—115 |
| 2,768,083 | 10/1956 | Hensgen | 99—116 |
| 2,781,269 | 2/1957 | Harper et al. | 99—116 |

HUGH R. CHAMBLEE, Primary Examiner